(12) United States Patent
McClure

(10) Patent No.: US 7,107,748 B2
(45) Date of Patent: Sep. 19, 2006

(54) AGRICULTURAL IMPLEMENT PICKUP

(75) Inventor: John R. McClure, New Holland, PA (US)

(73) Assignee: CNH America LLC, New Holland, PA (US)

( * ) Notice: Subject to any disclaimer, the term of this patent is extended or adjusted under 35 U.S.C. 154(b) by 65 days.

(21) Appl. No.: 10/903,308

(22) Filed: Jul. 31, 2004

(65) Prior Publication Data

US 2006/0021320 A1 Feb. 2, 2006

(51) Int. Cl.
*A01D 43/00* (2006.01)

(52) U.S. Cl. ............................................. 56/190

(58) Field of Classification Search ................ 56/190, 56/364, 341, 432, 219–225, 378, DIG. 20, 56/DIG. 1, 16.4, 12.4, 12.5
See application file for complete search history.

(56) References Cited

U.S. PATENT DOCUMENTS

| | | | |
|---|---|---|---|
| 2,524,233 A | 10/1950 | Russell | 56/364 |
| 2,571,489 A * | 10/1951 | Russell | 100/139 |
| 2,691,266 A | 10/1954 | Meyer et al. | 56/364 |
| 2,703,957 A | 3/1955 | Russell | 56/364 |
| 2,872,772 A * | 2/1959 | Nolt | 56/364 |
| 3,491,523 A | 1/1970 | Bornzin | 56/2 |
| 3,676,988 A | 7/1972 | Hauser-Lienhard | 56/1 |
| 3,815,344 A | 6/1974 | Kucera | 56/341 |
| 3,828,534 A * | 8/1974 | McRobert | 56/328.1 |
| 3,835,629 A * | 9/1974 | Rosendahl et al. | 56/14.4 |
| 3,924,391 A | 12/1975 | Cheatum | 56/364 |
| 3,943,845 A | 3/1976 | Mecklin et al. | 100/189 |
| 4,015,410 A * | 4/1977 | Smith | 56/364 |
| 4,386,493 A | 6/1983 | Holdeman et al. | 56/341 |
| 4,411,127 A | 10/1983 | Diederich, Jr. et al. | 56/364 |
| 4,463,546 A * | 8/1984 | Day | 56/364 |
| 4,516,389 A * | 5/1985 | Core | 56/341 |
| 4,539,798 A * | 9/1985 | Klinner | 56/16.4 R |
| 4,550,556 A | 11/1985 | Meiners | 56/341 |
| 5,293,732 A | 3/1994 | Vogelgesang et al. | 56/16.4 |
| 6,029,434 A | 2/2000 | Ratzlaff et al. | 56/341 |
| 6,295,797 B1 | 10/2001 | Naaktgeboren et al. | 56/364 |
| 6,314,709 B1 | 11/2001 | McClure et al. | 56/364 |
| 6,688,092 B1 | 2/2004 | Anstey et al. | 56/220 |
| 6,877,304 B1 * | 4/2005 | Smith et al. | 56/364 |
| 2003/0131575 A1 * | 7/2003 | Anstey et al. | 56/16.4 R |
| 2003/0182921 A1 * | 10/2003 | McClure | 56/341 |

* cited by examiner

*Primary Examiner*—Árpád Fábián Kovács
(74) *Attorney, Agent, or Firm*—William Stader; Michael G. Harms

(57) ABSTRACT

A pickup for an agricultural implement, the pickup including spaced-apart end members supporting an upper windguard and adaptable for selective connection to multiple windguard configurations.

7 Claims, 7 Drawing Sheets

AGRICULTURAL IMPLEMENT PICKUP

BACKGROUND OF THE INVENTION

The present invention relates generally to hay balers, and more particularly to an improved windguard system for the crop pickup and feeder assembly of a round baler.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, most likely a round baler, is pulled along the windrows to pick up the crop material and form it into cylindrically-shaped round bales. More specifically, the pickup of the baler gathers the cut and windrowed crop material from the ground then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber Consists of a pair of opposing sidewalls with a series of belts that rotate and compress the crop material into a cylindrical shape. When the bale has achieved a desired size and density, the operator wraps the bale to ensure that the bale maintains its shape and density. The operator raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is, itself, known in the prior art, as shown, for example, in U.S. Pat. Nos. 5,595,055 and 6,644,006. The rotor mechanism is usually referred to as the "stuffer", because it stuffs the crop material into the gap between the floor roll and the starter roll into the bale-forming chamber.

It has been customary to provide the pickup mechanism with a lower windguard which pivots and floats to hold down the hay or other crop material as it is being fed rearwardly to prevent the crop material from being blown off the pickup floor and to ensure an adequate compaction of the crop material for good feeding into the stuffer mechanism. Additionally, a separate windguard is sometimes included above the stuffer assembly; however, this windguard pivots only, without floating. The pivot point of known upper windguards is positioned well above the stuffer assembly to allow large slugs of crop to pass underneath. With this high pivot position, the windguard often fails to keep the crop compressed when under normal crop flow. When the crop is not compressed as it enters the bale-forming chamber, difficulties in starting a bale can occur.

Conventional windguards are fairly simple structures, and include an elongated pipe-like member, often referred to as a windguard pipe, extending across the front of the pickup mechanism with a plurality of tines attached to the windguard pipe along its length extending rearwardly over the pickup mechanism. This type of windguard may be manually adjusted for different sizes of windrows of crop material by positioning the windguard pipe and the tines closer to the pickup mechanism for small windrows or farther away from the pickup mechanism for large windrows. If the windguard is adjusted for small windrows and a large windrow is encountered, the windguard pipe and tines may be too close to the pickup mechanism to accommodate the large windrow. This could cause plugging of the pickup mechanism. If the windguard is adjusted for large windrows and a small windrow is encountered, the windguard tines may be too far away from the pickup mechanism to protect the small windrow. This could result in wind, loss of crop material, or, as mentioned above, difficulties in starting the bale core.

It would improve the operation of agricultural crop pickups if the problems identified above could be overcome.

SUMMARY OF THE INVENTION

Accordingly, it is an object of the present invention is to provide an improved windguard system for round balers;

Another object of the present invention is to provide an improved windguard with interchangeable crop-engaging elements for the pickup and stuffer of a round baler;

It is another object of the instant invention to provide a windguard for the pickup of a round baler, the windguard having interchangeable crop-engaging elements that provide better feeding in a wider range of crops;

It is another object of the instant invention to provide a windguard that provides increased versatility to a round baler;

It is another object of the instant invention to provide an agricultural implement pickup with upper and lower windguards, both of which rotate and float;

It is a still further object of this invention to provide an agricultural implement pickup with upper and lower windguards supported by side sheets, the side sheets adaptable to be connected to multiple configurations of windguards;

It is an even still further object of this invention to provide an agricultural round baler pickup adaptable for selective connection to multiple configurations of windguards;

It is another object of this invention to provide and effective and efficient assembly to move crop material through and agricultural pickup and stuffer; and It is yet another object of this invention to provide a novel windguard structure that selectively employs multiple windguard configurations that is durable in construction, inexpensive of manufacture, carefree of maintenance, facile in assemblage, and simple, versatile and effective in use.

These and other objects are attained by providing a pickup for an agricultural implement, the pickup including spaced-apart end members supporting an upper windguard and adaptable for selective connection to multiple windguard configurations.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Round balers are well known in the agricultural industry, and the instant invention can be used with substantially any of such machines. Reference is made, for example, to U.S. Pat. Nos. 6,688,092 and 6,295,797 that illustrate two such balers.

Figure 1:
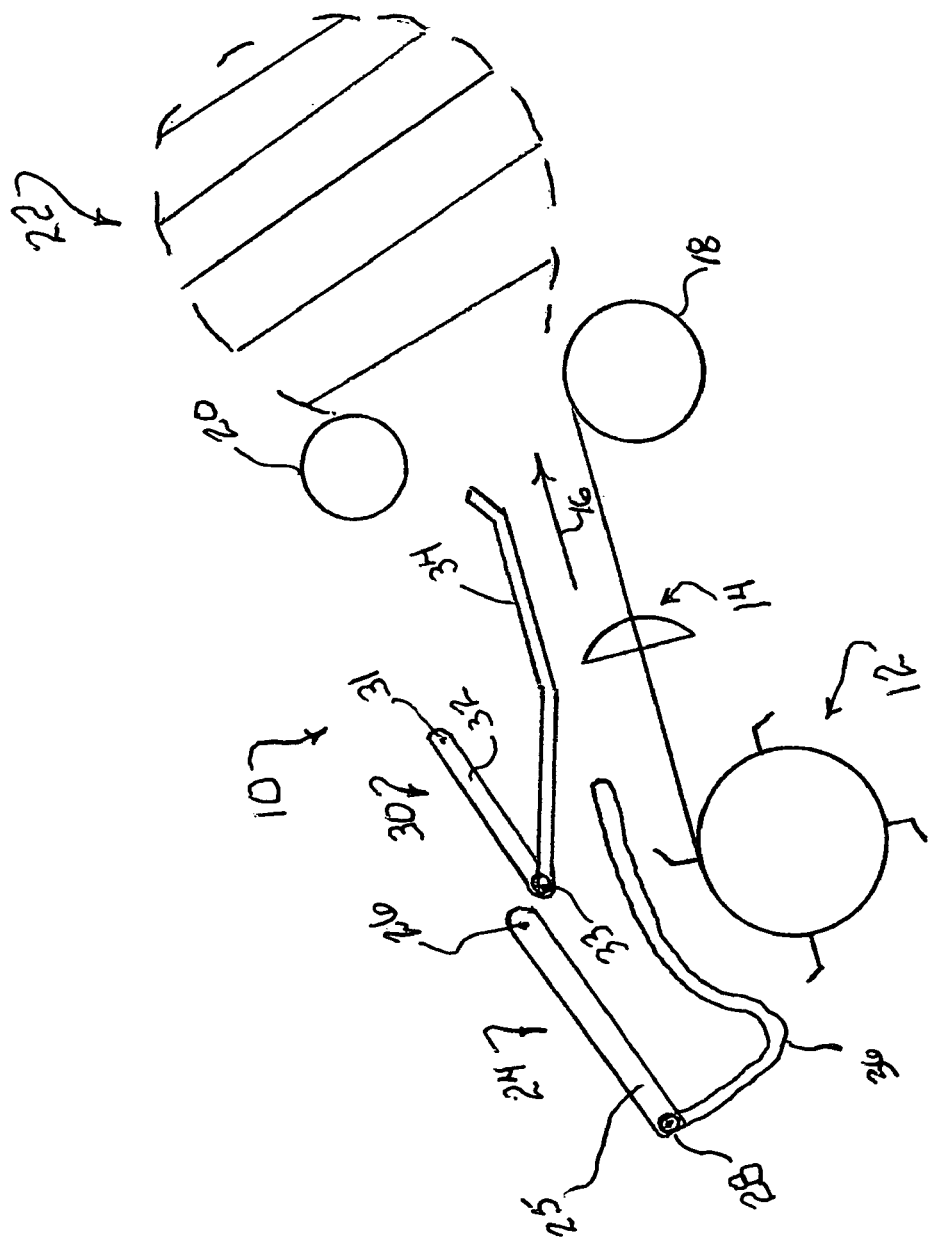
FIG. 1 is a representation of a partial side sectional view of a round baler pickup, stuffer and bale-forming chamber showing a windguard in place for normal operation.

FIG. 1 depicts an agricultural round baler, generally designated 10, as it would be pulled from right to left along a windrow of cut crop material by a tractor (not shown). Baler 10 is comprised of a wheel-supported bale-forming mechanism with a crop pickup 12 for moving the crop material from the field along and past the stuffer assembly 14 in the direction of arrow 16. The stuffer assembly pushes the crop material into the gap between the floor roll 18 and the starter roll 20 and thence into the bale-forming chamber 22. Pickup 12 is usually wider than the bale-forming chamber of the baler 10 and includes its own frame mounted to the main frame of the baler for pivoting about a horizontal transverse axis.

As alluded to previously, the crop in the field is usually arranged in a windrow as it is engaged by the pickup 12. Depending upon the condition of the crop, i.e., the volume and length of crop, the flow of the crop material through the pickup and stuffer can range from fairly constant to irregular, and may contain frequent or infrequent slugs—a larger than normal volume of material. The issue addressed herein relates to the understanding that the core of a bale, and the starting of a new bale, is improved if the crop being fed into the gap between the floor roll and the starter roll is compressed rather than fluffed or feathery and when the crop is efficiently and effectively moved through the pickup and stuffer.

The prior art, as exhibited for instance in the '092 patent identified above, recognizes that a windguard properly located above the pickup can promote a more continuous and even flow of crop material. The instant invention is to a significant improvement to the windguard concept. Some current round balers with stuffers use two windguards, one upper and one lower, to keep the crop compressed while being fed the pickup and stuffer into the bale-forming chamber. The lower windguard is situated above the pickup and is capable of floating and pivoting. The upper windguard is positioned above the stuffer assembly and pivots without floating. This upper windguard is positioned with the pivot well above the stuffer assembly to allow large slugs of crop material to pass underneath. With this high pivot position, the windguard fails to keep the crop material compressed when under normal crop flow. As indicated, when the crop is not compressed when entering the bale chamber, difficulties in starting a bale core can occur.

Still referring to FIG. 1, one embodiment of the invention is shown to include a pair of windguards 24 and 30 that provide the necessary crop compaction prior to being fed into the bale-forming chamber. The lower windguard 24 includes a float arm 25 rotatable about fixed pin 26. The forward end of float arm 25 is rotatably affixed to a transverse cross member 28 that extends across the width of the pickup 12. Transverse cross member 28 is populated with a plurality of spaced-apart tines 36. The float arm 24 is positioned such that the tines 36 may be shaped as shown, extending forwardly of an above pickup 12 and extending rearwardly toward stuffer 14. With a similar structural arrangement on the opposite side of the pickup, the transverse member 28 and the tines 36 are adequately supported and the rotation about pin 26 and the connection between arm 25 and transverse member 28 allow the tines 36 to float with the volume of crop moving through pickup 12 and to maintain an appropriate amount of compaction thereof. Upper windguard 30 is supported by a structure quite similar to that just defined for the lower windguard. Float arm 32 rotates about pin 31 and transverse member 28, similar to 28, supports a plurality of spaced-apart fines 34 across the pickup 12. Tines 34 extend rearwardly from the forward end of float arm 32 toward the transverse gap between floor roll 18 and starter roll 20. Thus, both the upper and lower windguards both float and pivot (or rotate), providing the desires contact with and compaction of crop material.

The weight of each windguard is enough to maintain the crop in a compressed state while entering the bale-forming chamber. In operation, the crop is engaged by the pickup 12 and pushed toward the stuffer assembly 14. The lower windguard 24, if for instance a slug is fed, pivots upwardly about axis formed by pin 26 and floats about the axis of transverse member 28. As the slug moves rearwardly through the stuffer assembly 14 the slug causes the upper windguard 30 to pivot upwardly about pin 31. During this entire operation, the windguards are in contact with the crop material, or slug, and maintains it in a compressed condition to be fed into the bale-forming chamber. The maximum downward movement of transverse member 28 may be limited by a chain or other similar flexible connector between member 28 and another part of the pickup or baler structure.

It is well known that as crop conditions vary the performance of agricultural implements also varies. The variations in performance can be explained by the difficulties in designing a pickup assembly that consistently feeds the crop material no matter what the length or volume of crop material being handled. In a round baler crop conditions are encountered that run the full range of possibilities; however, there are modifications, such as structural alternatives (or the modularity of being able to choose different alternatives) to the pickup that can be made to more effectively handle the variations. Other embodiments of the instant invention directly address this issue.

Figure 2:
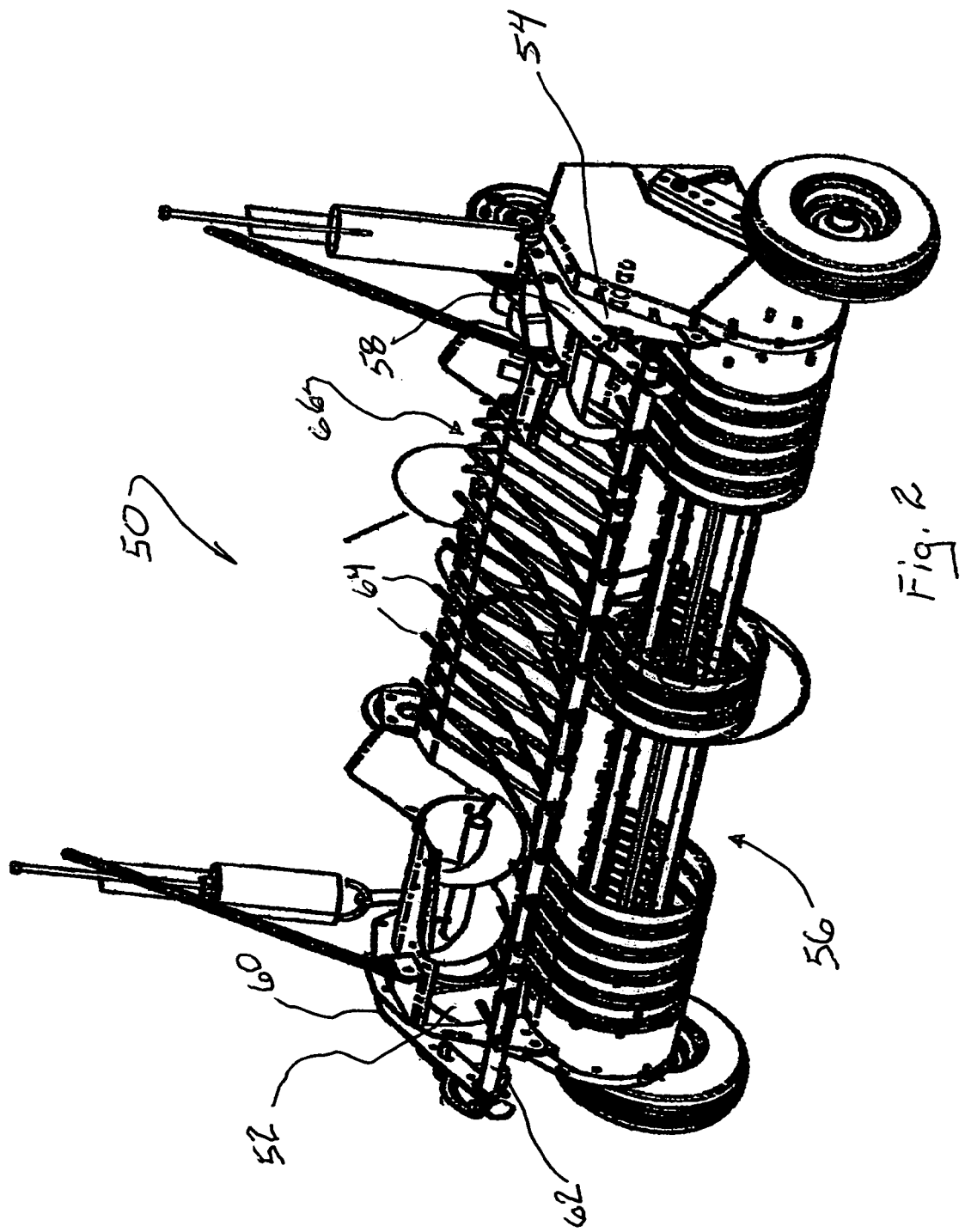
FIG. 2 is a partial front perspective view of a basic round baler pickup with a combined upper and lower windguard.

FIG. 2 shows a basic low cost windguard on a round baler pickup assembly, generally depicted as 50. Pickup assembly 12 includes a wheel-supported framed having generally vertical side members, or sheets 52 and 54 with a pickup reel 56 supported therebetween. Two support arms 58, 60 are rotatably affixed to respective side members 52, 54 and at the other end to transverse member 62. Transverse member 62 is a pipe-like element with a plurality of tines 64 affixed thereto in a spaced-apart relationship. The length of support arms 58, 60 are such that transverse member 62 is generally above the pickup reel 56. The transverse member 62 is rotatably mounted to the end of the respective support arms 58, 60 and rotatably pinned at the other end to respective end members 52, 54. This arrangement allows both flotation and rotation of the windguard. This configuration is a general compromise regarding the effectiveness with a range of crop conditions. As previously stated, pickup assemblies have a wide variety of configurations. The pickup assembly depicted in FIG. 2 employs consolidating augers on the outer ends of the transition between the pickup reel 56 and the stuffer 66. The augers further consolidate the crop material to insure an effective and efficient bale formation.

Figure 3:
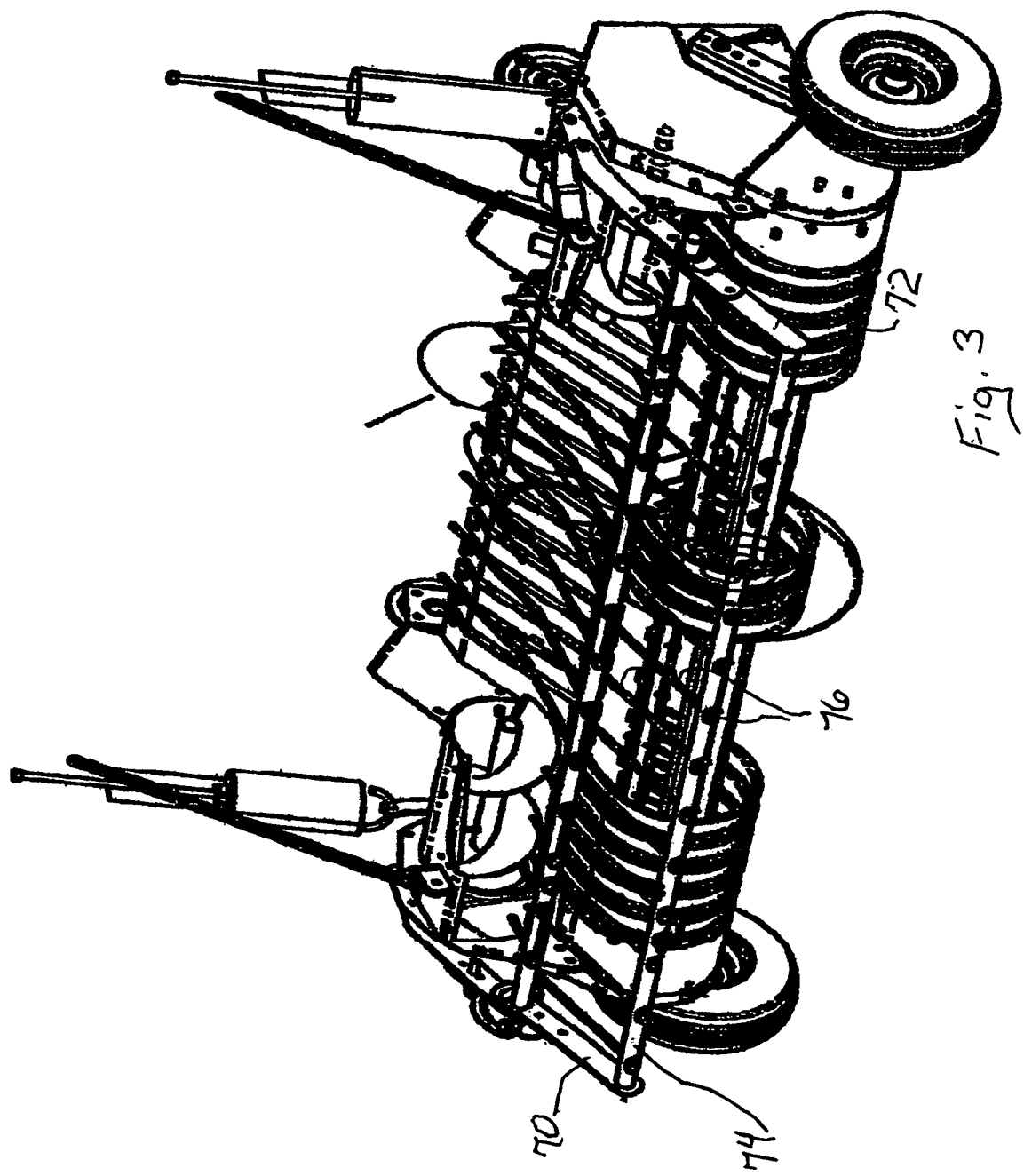
FIG. 3 is a partial perspective view of a tine windguard extension.

FIG. 3 shows a modification to the windguard shown in FIG. 2. Two extension arms 70, 72 are rotatably affixed to the respective forward ends of support arms 58, 60. The forward ends of extension arms 70, 72 rotatably support a second transverse member 74. Similarly, the transverse member 74 has a plurality of tines 76 affixed thereto and extending rearwardly and below transverse member 62. Both the primary and extension windguards both float and rotate because of the way in which the transverse members are supported, and provide a fairly consistent compression of the crop material as it feeds through the pickup. This configuration works best with large windrowed crops.

Figure 4:
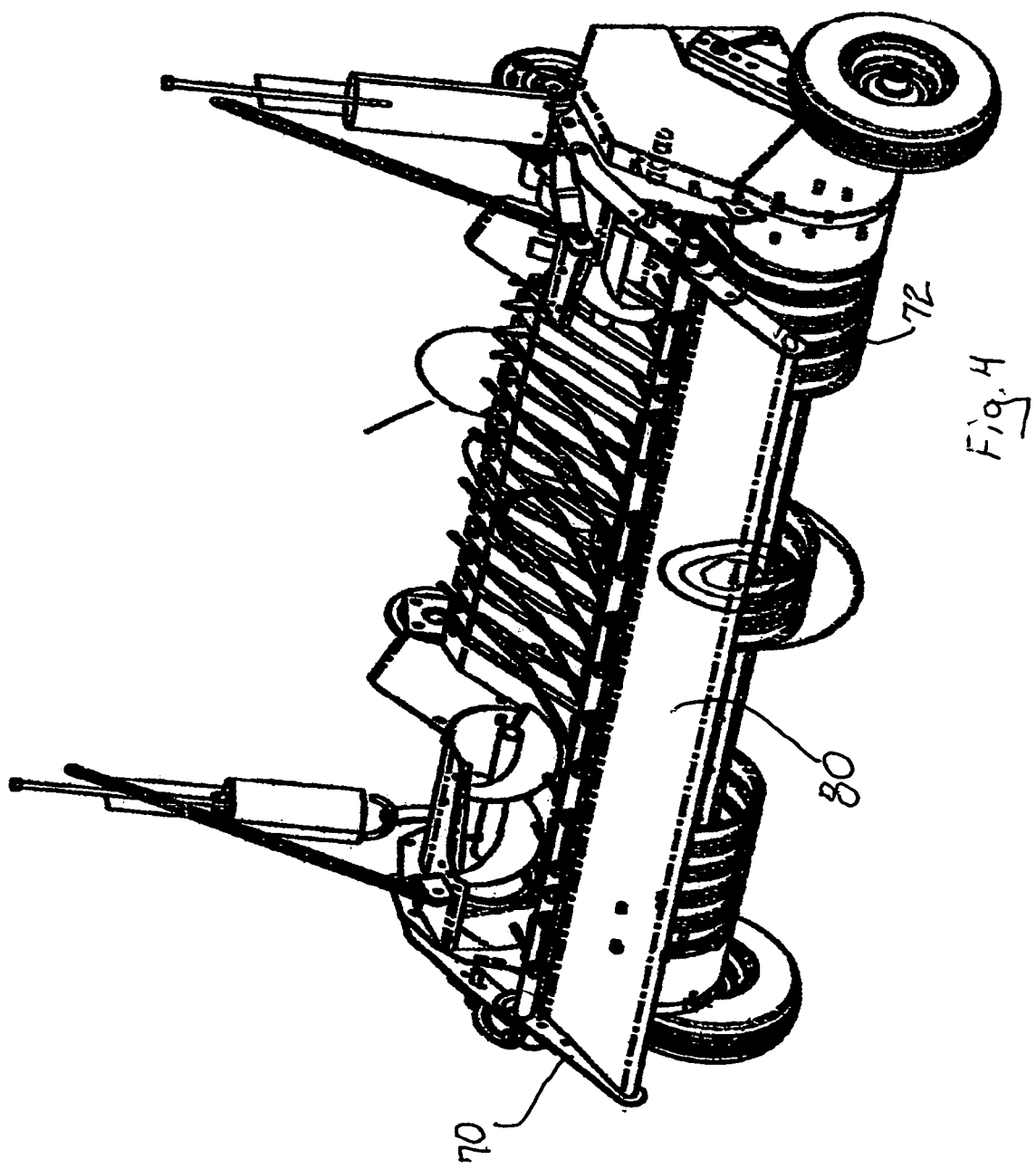
FIG. 4 is a partial perspective view of a plate-type windguard extension.

In FIG. 4 there is depicted an alternative to the extension shown in FIG. 3. Extension arms 70, 72 are supported and connected as the embodiment of FIG. 3; however, instead of having tines, the extension is formed of a transverse plate 80. Plate 80 may be formed with a cylinder or partial cylinder at the leading edge through which a pipe-like member may fit (and to which the plate is affixed) for support of the plate and pivotable attachment to the forward ends of extension arms as roller 120, 72. Thus, similarly to the structure of FIG. 3, the basic and the extension windguards both float and rotate. Depending upon the width of the plate (front to back) a stop may be advantageous to prevent over rotation thereof. Again, a chain or similar device may be used to adjust the maximum downward movement of the extension windguard. This configuration is best suited for short light crops.

Another alternative embodiment would be to employ a roller windguard on the same extension structure as described above for the plate extension. The roller would have the configuration shown more particularly as roller 120 on the front of the machine of FIG. 7.

Figure 5:
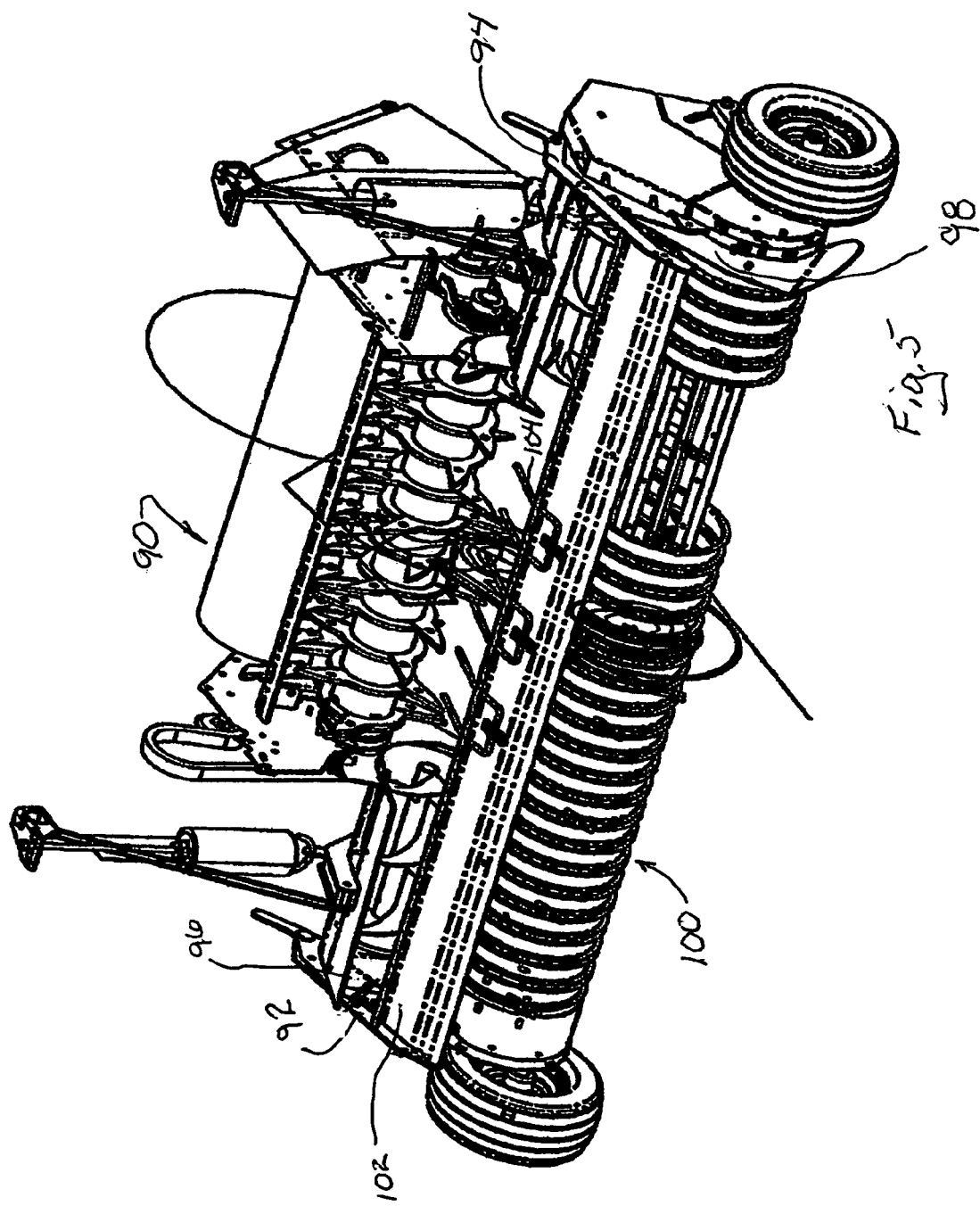
FIG. 5 is partial perspective view of a basic low cost plate windguard.
Figure 6:
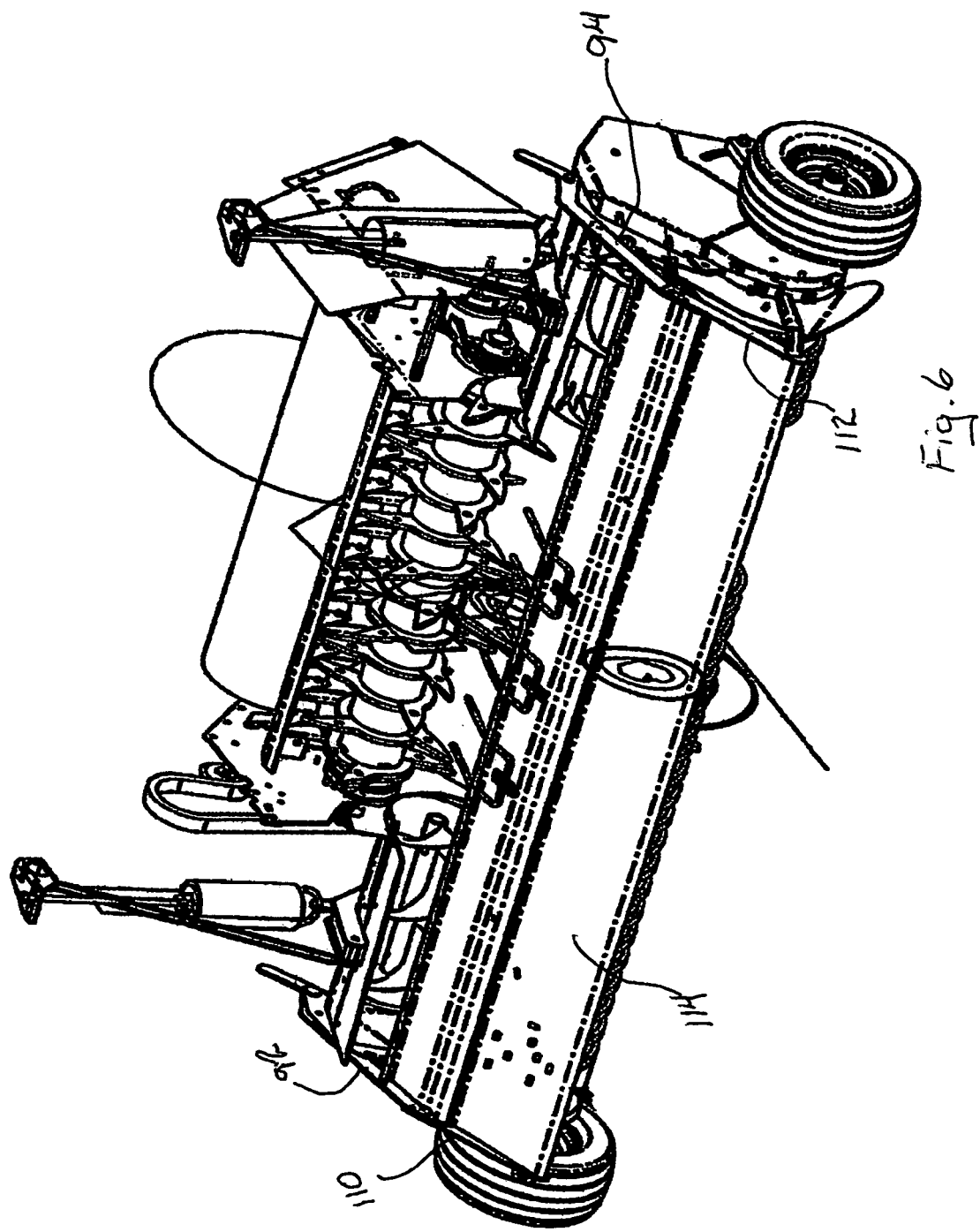
FIG. 6 is a partial perspective view of a plate windguard extension.
Figure 7:
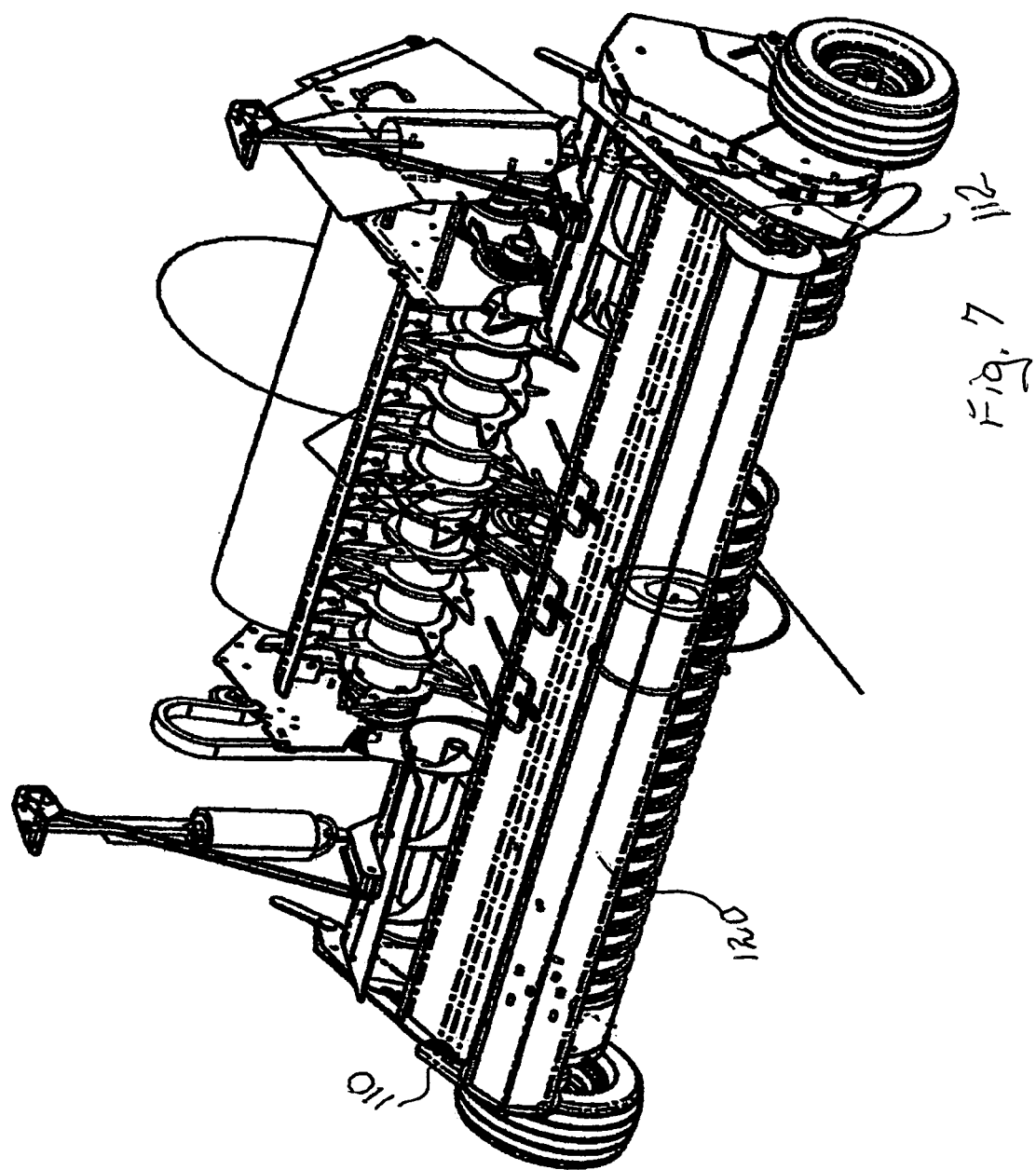
FIG. 7 is a partial perspective view of a roller windguard extension.

The pickup assembly shown in FIGS. 5–7 employs a rotor feeder rather than what was described above as a stuffer, though the type of feeder is not particularly significant to the instant invention. FIG. 5 depicts a general windguard arrangement, suitable for many, but not all crop conditions. Two support arms 92, 94 are rotatably pinned adjacent the rearward ends thereof to side members 96, 98 and extend downwardly and forwardly to a location above and forward of pickup reel 100. A transverse plate 102 is rigidly affixed to the forward ends of support arms 92, 94 and may have a few tines, such as 104 affixed thereto and directed generally rearwardly to assist in the transport and confinement of crop material. This particular configuration is also best used with heavy, long crops.

FIG. 6 depicts a structure similar to that of FIG. 5, but with two extension arms 110, 112 and the transverse plate 114. Plate 114 is rigidly affixed to extension arms 110, 112, but adjustably rotatable about the connection between extension arms 110, 112 and support arms 92, 94. This adjustment is made manually by the operator.

The windguard arrangement shown in FIG. 7 is similar to that of FIG. 6; however, instead of a plate, a roller 120 is affixed to the extension arms 110, 112 for rotation as it engages the crop materials. The roller preferably has a hexagonal peripheral surface in cross-section, rather than round. This configuration is used to compress large windrowed crops for better feeding.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A windguard mechanism for use on the pickup mechanism and feeder assembly of a round baler, said pickup mechanism having first and second opposing spaced apart generally vertical side sheets and a transverse pickup reel rotatably supported therebetween, and said baler including a transverse floor roll and a transverse starter roll with a transverse gap therebetween, said windguard comprising:

an upper windguard comprising a first plurality of elongate spaced-apart tines having a first end and a remote second end, said tines attached together at a first position adjacent said first end of said times by a first transverse tine frame member forming a first transverse rotation axis;

first and second elongate float arms each having a first and a remote second end, each said first and second float arm rotatably affixed adjacent the first end thereof to a respective side sheet of said pickup and affixed adjacent the second end thereof to said first transverse tine frame member for rotation about said first transverse rotation axis such that the first plurality of tines float in position generally above said feeder assembly and said first plurality of tines extend generally therefrom to said transverse gap between said floor roll and said starter roll;

third and fourth elongate float arms each having a first and a remote second end, each said third and fourth float arm rotatably affixed adjacent the first end thereof to a second end of respective said first and second float arms and said second ends of said third and fourth float arms adaptable to selectively connect to one of a multiple of configurations of lower windguards.

2. The windguard of claim 1, wherein:
said feeder assembly comprises a stuffer mechanism.

3. The windguard of claim 1, wherein:
all of said multiple configurations of lower windguards both float and rotate and includes:
an elongate generally flat plate affixed to a transverse frame member.

4. The improvement of claim 3, wherein:
said elongate flat plate has a rotatable connection to said third and fourth float arms.

5. The windguard of claim 1, wherein all of said multiple configurations of lower windguards both float and rotate and includes an elongate roller.

6. The windguard of claim 5 wherein said elongate roller rotates upon contact with crop material.

7. The windguard of claim 1, wherein all of said multiple configurations of lower windguards both float and rotate and includes a plurality of tines affixed to second elongate transverse tine frame.

* * * * *